June 10, 1930.                S. BOLIN                1,762,954
COVER FOR VEHICLE SPRINGS
Filed Dec. 4, 1925
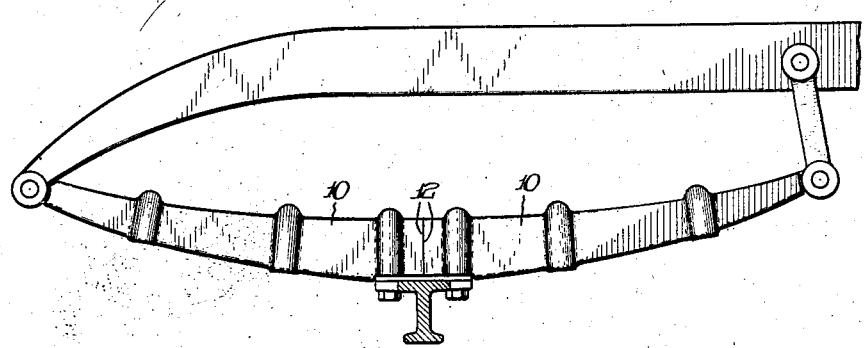
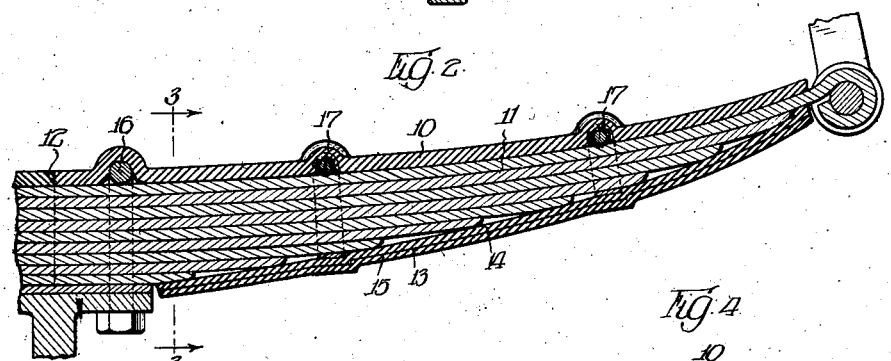
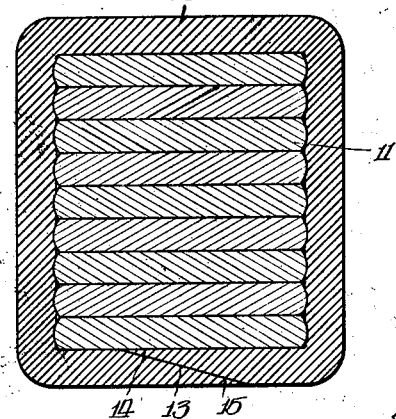
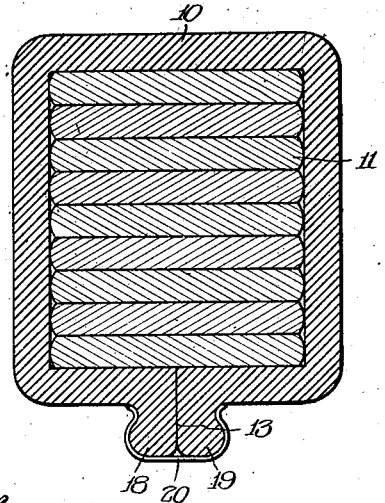
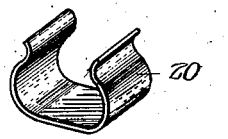
Witness:
A. Burkhardt
Inventor:
Stanley Bolin,
By Cromwell, Greist & Warden
Attys Patented June 10, 1930

1,762,954

UNITED STATES PATENT OFFICE

STANLEY BOLIN, OF CHICAGO, ILLINOIS, ASSIGNOR OF ONE-HALF TO LEONARD M. BOLIN, OF CHICAGO, ILLINOIS

COVER FOR VEHICLE SPRINGS

Application filed December 4, 1925. Serial No. 73,151.

The object of the invention is to provide an improved spring cover which is inexpensive to manufacture, may be applied to or removed from the spring quickly and easily, adds appreciably to the general appearance of the vehicle on which used, and fits closely about all portions of the spring without in any way hampering the normal action of the same.

Two different forms of the improved cover are presented herein for the purpose of exemplification, from which it will be evident that the invention is susceptible of embodiment in a number of variously modified forms coming equally within the comprehensive scope of the invention as defined in the appended claims.

In the accompanying drawing:

Fig. 1 is a side view of a vehicle spring equipped with the spring cover of the invention;

Fig. 2 is a longitudinal section through one of the covers in position on the spring;

Fig. 3 is a transverse section taken on the line 3—3 of Fig. 2;

Fig. 4 is a view corresponding to Fig. 3, but showing a slightly modified form of the cover; and Fig. 5 is a perspective view of one of the fastening clips used with that form of the cover shown in Fig. 4.

The spring cover, as will be observed in the drawing, is a casing 10 which envelopes one half of a spring 11, and is used in conjunction with a similar casing which envelopes the other half, the two casings being arranged complementarily with their adjacent ends 12 preferably in abutting relation.

The casing is made of soft rubber, and is molded into shape, whereby it will tend under its own resiliency to assume at all times a closely fitting position about the spring. The casing is of course open at both ends, and is provided with a longitudinally extending slit 13 which, while normally closed, is temporarily spread open in applying the casing to or removing it from the spring.

In the casing illustrated in Figs. 1 to 3 inclusive, the meeting edges 14 and 15 are beveled and lapped, placing the slit 13 at an angle, and no means other than the inherent resiliency of the molded rubber is employed to maintain the casing in proper position about the spring. The usual spring-attaching bolts 16 and spring-fastening clips 17 may be accommodated in the casing by molding the walls of the same in conformity with the contour of those parts.

A particularly close fit of the casing about the spring may be obtained by molding the walls of the casing in such a way that the side walls will tend to assume positions at slightly acute angles to the top wall and the bottom walls will likewise tend to assume positions at similar angles to the side walls, whereby all of such walls will press resiliently inward against the portions of the spring with which they come into contact.

In the casing illustrated in Figs. 4 and 5, the meeting edges 18 and 19 are in perpendicular abutment, and, if desired, may be readily fastened together by some suitable means, such as a number of small sheet metal clips 20, in which case the edges are preferably shaped, as shown, to provide enlargements over which the clips may be forced into positions of engagement. It will be appreciated, however, that the meeting edges may be shaped and fastened together in a great many other different ways.

I claim:

1. A spring cover which consists of a casing of soft rubber molded to fit about the spring and slitted longitudinally to permit application to or removal from the spring upon lateral expansion at the slit, said casing being so molded that the walls of the same will press resiliently against the spring to produce a sealed closure.

2. A spring cover, consisting of a longitudinally split gaiter the edges of which are provided with undercut projections of bulbous cross section, and a split tube adapted to engage and draw together said edges.

3. A spring cover, comprising a flexible casing which is shaped to fit about the spring and is slitted longitudinally to permit application to or removal from the spring upon lateral expansion at the slit, and a resiliently expansible fastening member which is adapted to span the slit in the casing in resiliently clamped association with portions of the casing adjacent the edges of the slit.

4. A spring cover, consisting of a longitudinally slitted casing of flexible material having undercut formations along the edges of the slit, and a resiliently expansible U-shaped fastening member adapted to fit over and embrace the formations in resiliently clamped association therewith.

5. A spring cover, comprising a longitudinally slitted casing of soft rubber having ribs along the edges of the slit, and a fastening member of generally U-shaped cross section which is adapted to fit over and embrace